T. FORTUNE.
TIRE TONGS.
APPLICATION FILED JULY 17, 1912.
1,068,997.
Patented July 29, 1913.
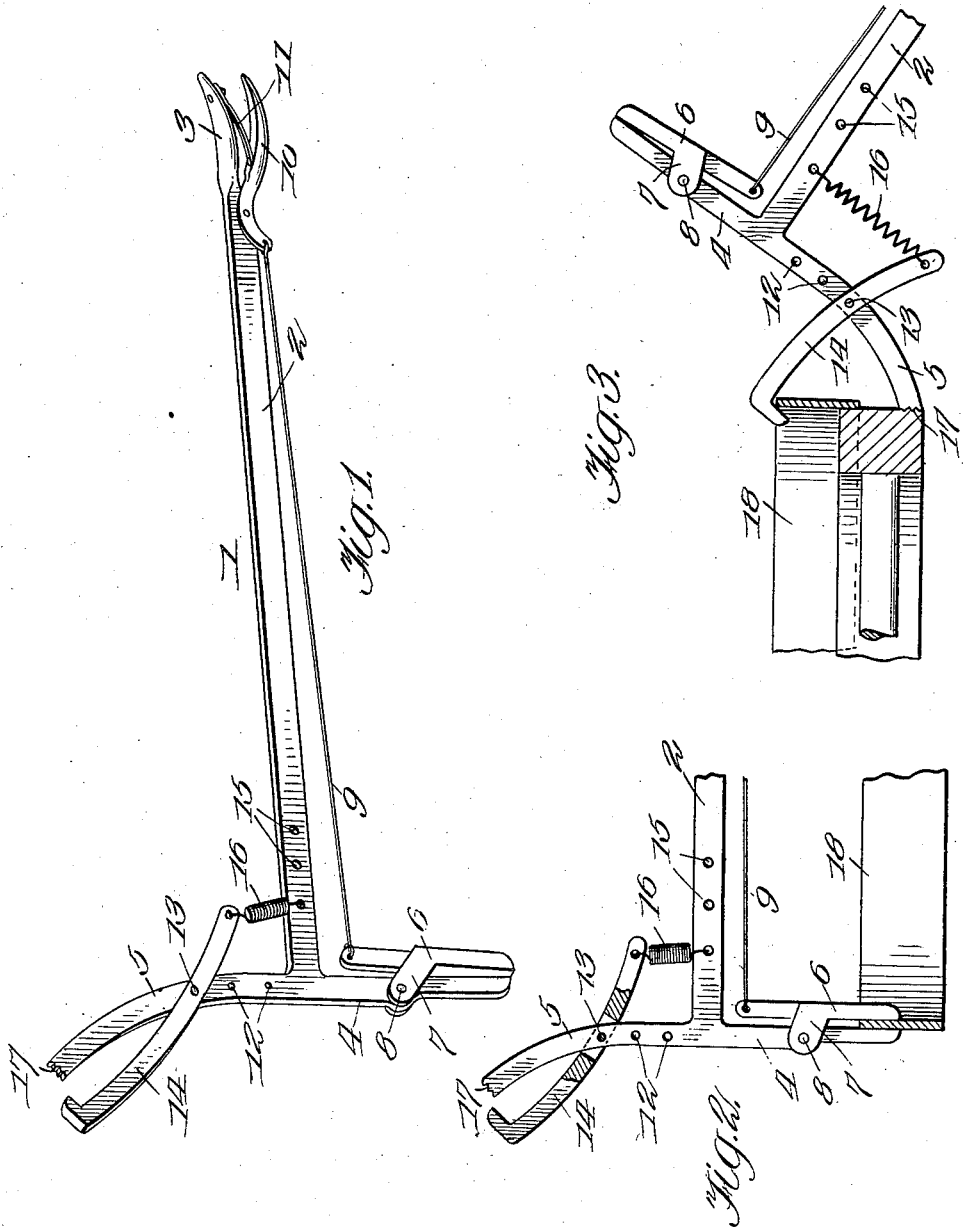
Witnesses
Samuel E. Wade
Wm. J. Koerth
Inventor
Theobald Fortune,
By Victor J. Evans
Attorney

UNITED STATES PATENT OFFICE.

THEOBALD FORTUNE, OF COURTENAY, BRITISH COLUMBIA, CANADA.

TIRE-TONGS.

1,068,997.  Specification of Letters Patent.  Patented July 29, 1913.

Application filed July 17, 1912.  Serial No. 709,920.

*To all whom it may concern:*

Be it known that I, THEOBALD FORTUNE, a subject of the King of Great Britain, residing at Courtenay, in the Province of British Columbia and Dominion of Canada, have invented new and useful Improvements in Tire-Tongs, of which the following is a specification.

The present invention relates to certain novel improvements in tongs primarily intended for use by wheel-wrights in handling heated tires and for positioning the said tires upon the felly of a wheel, and the invention resides in the novel construction, combination and arrangement of parts set forth in the following description, and falling within the scope of the appended claims.

In the drawing, Figure 1 is a perspective view of tire tongs constructed in accordance with the present invention. Fig. 2 is a view illustrating the manner in which the tongs are employed in handling the heated tire for positioning the same upon the wheel. Fig. 3 is a similar view illustrating the manner in which the tongs are employed for forcing the tire upon the wheel.

Referring now to the drawing in detail, the numeral 1 designates my improved tire tong. The tong includes an arm 2 having one of its ends provided with a suitable handle 3 and its opposite end arranged angularly of both of the longitudinal edges of the said arm to provide, what I will term jaws 4 and 5, the elements just described being, therefore, substantially in the form of a T.

The numeral 6 designates a jaw which has its sides flanged as at 7 and which is pivotally connected as at 8 with the jaw 4, with which the said jaw 6 is adapted to coöperate.

The numeral 9 designates a rod which is connected with the jaw 6, and this rod is in turn connected with a pivoted handle 10 which coöperates with a handle 3 of the arm 2. The handle 10 is at all times contacted by a spring 11 which is secured to the handle 3 and which is adapted, through the medium of the rod 9 to force the jaw 6 toward and into engagement with the jaw 4.

The jaw 5 is provided with a plurality of openings 12, the same adapted to receive a removable pintle 13 whereby a hook member 14 is adjustably retained upon the said jaw 5. The lever 2 is also provided with a plurality of openings 15, any one of which being adapted to receive one of the end convolutions of a spring 16, while the opposite end convolution of the said spring is passed through an opening in the end of the hook 14. The outer edge of the jaw 5 is serrated as at 17, so that the jaw will obtain a biting hold upon the felly of the wheel when a tire is to be forced upon the said felly, as illustrated in Fig. 3 of the drawing.

In Fig. 2 of the drawing there has been illustrated the manner in which the tire 18 is handled either when being conveyed to the fire for heating and shrinking or handling the said tire for arranging the same upon the felly of the wheel.

Having thus described the invention, what I claim is:—

1. In a device for the purpose set forth, a substantially T-shaped member embodying an arm and jaws, a jaw member pivoted to one of the jaws of the arm, means connected with the arm and last named jaw for operating the said jaw, a hook member pivotally connected with the second jaw of the arm, and a resilient element secured to both the arm and the hook.

2. In a device for the purpose set forth, an arm having one of its ends provided with oppositely arranged angular members forming jaws, a pivoted jaw member secured to one of the jaws of the arm, means provided between the said pivoted jaw and the arm for swinging the said jaw, a hook member adjustably connected with the second jaw of the arm, and an adjustable tension member between the hook and the arm.

In testimony whereof I affix my signature in presence of two witnesses.

THEOBALD FORTUNE.

Witnesses:
 J. H. MILLARD,
 THOS. BANNERMAN.